United States Patent [19]

Tenkula et al.

[11] Patent Number: 4,810,850

[45] Date of Patent: Mar. 7, 1989

[54] METHOD OF ARC SPRAING AND FILLER WIRE FOR PRODUCING A COATING WHICH IS HIGHLY RESISTANT TO MECHANICAL AND/OR CHEMICAL WEAR

[75] Inventors: Jaakko Tenkula; Bjarne Hellman, both of Raahe; Juha Huusko, Oulu, all of Finland

[73] Assignee: Telatek Oy, Raahe, Finland

[21] Appl. No.: 55,771

[22] Filed: May 28, 1987

Related U.S. Application Data

[63] Continuation of Ser. No. 583,054, Feb. 23, 1984.

[30] Foreign Application Priority Data

Mar. 4, 1983 [FI] Finland ................................ 830737

[51] Int. Cl.$^4$ .............................................. B23K 35/22
[52] U.S. Cl. ............................ 219/146.1; 219/146.41; 219/76.14
[58] Field of Search ........... 219/146.1, 146.22, 146.32, 219/146.41, 76.14, 76.16

[56] References Cited

U.S. PATENT DOCUMENTS

| | | | |
|---|---|---|---|
| 2,785,285 | 3/1957 | Bernard | 219/146.22 |
| 4,228,223 | 10/1980 | Knotek et al. | 219/146.41 |

FOREIGN PATENT DOCUMENTS

| | | | |
|---|---|---|---|
| 38606 | 9/1965 | German Democratic Rep. | 219/76.14 |
| 128698 | 10/1981 | Japan | 219/146.1 |
| 82917 | 11/1979 | Switzerland | 219/76.14 |
| 406680 | 8/1974 | U.S.S.R. | 219/146.41 |
| 954193 | 8/1982 | U.S.S.R. | 219/146.1 |

OTHER PUBLICATIONS

Cary, Howard B., *Modern Welding Technology*, Englewood Cliffs, N.J.: Prentice-Hall, Inc., 1979, pp. 259–260.

*Primary Examiner*—Teresa J. Walberg
*Attorney, Agent, or Firm*—Webb, Burden, Ziesenheim & Webb

[57] ABSTRACT

A filler wire of a new type for use in arc-spraying, by means of which coatings highly resistant to mechanical and/or chemical wear can be produced. The wire comprises a soft sheath made from unalloyed or alloyed metal, inside which there is a very fine-grained filler material which contains, in addition to iron, other metals and/or special carbides and/or oxides, the powder being prepared by atomizing a melt of the said constituents.

3 Claims, No Drawings

METHOD OF ARC SPRAING AND FILLER WIRE FOR PRODUCING A COATING WHICH IS HIGHLY RESISTANT TO MECHANICAL AND/OR CHEMICAL WEAR

BACKGROUND OF THE INVENTION

The present invention relates to an arc-spraying filler wire by means of which coatings highly resistant to mechanical and/or chemical wear can be produced.

Places in which both mechanical and chemical wear is very heavy, for which reason the apparatus must be maintained or repaired frequently, include peat power stations, in which the boiler walls, grates, feeder screws, flue gas blowers and other similar parts are exposed to heavy chemical and mechanical wear.

Corrosion is caused by various acids, acidic compounds present in the peat, and also be various microorganisms. Wear, on the other hand, is caused by the constituents of the ash present in the peat, such as various hard $SiO_2$, $Al_2O_3$ and $Fe_2O_3$ crystals as well as sand and stones carried along by the peat. The wear caused by these hard particles is erosive and abrasive by nature. In addition to peat, coal and similar boiler plants, heavy wear occurs also in so-called fluidized-bed furnaces, in which sand-like circulating-dust suspension causes erosive wear of the wall pipes.

Several different methods have been used for preventing the problems of corrosion and wear described above. For example, parts of peat plants have been painted, welded and also thermally sprayed. An advantage of welding is that it produces coatings which are highly resistant to corrosion and erosion. Its disadvantages include deformations due to welding and the fact that, for example it is impossible to coat boiler walls in a short period of time. Furthermore, it is very difficult to produce thin coatings by welding. Painting and other corresponding coating methods can be used when the operating temperature is low and when erosive wear and abrasive wear are not significant.

When it is necessary to coat large surfaces which are exposed to both corrosion and erosion, the best method is thermal spraying. For example, soda-ash boilers have been coated by wire spraying for several years. For the wire spraying of sode-ash boilers there have been developed filler materials which resist corrosion quite well, but their resistance to erosion is not yet good. The reason is that materials resistant to erosion and abrasion are hard, a fact which prevents their being drawn into wire. Materials which are resistant to corrosion, erosion and abrasion can be prepared into powders, and so they are suitable and also used for welding and plasma spraying; also powder spraying is possible.

As was noted above, the use of welding is limited because of deformation and the slowness of the method, and, on the other hand, plasma spraying has a disadvantage in its high price. Powder spraying, for its part, has a disadvantage in that its adherence to the base material is in general poor and the porosity of the coating is high, a factor which promotes corrosion and weakens conduction of heat. Arc spraying has had the same disadvantage as wire spraying; owing to their great hardness it is not possible to roll wire from suitable materials.

SUMMARY OF THE INVENTION

The object of the present invention is to provide, in an economical, easy and simple manner, a coating which has a good resistance to chemical and/or mechanical wear, also for the coating of large surfaces.

The basic idea of the invention lies in that in arc spraying a totally new type of filler wire is used which can be alloyed in the desired manner in order to produce resistance to mechanical and/or chemical wear.

The filler wire (or wires) according to the invention comprises a sheath made from soft unalloyed or alloyed metal and a core consisting of metal powder or of a mixture of a metal powder and special carbides and/or oxides.

Examples of the special carbides are the carbides of chromium, tungsten, vanadium, titanium, niobium, silicon, molybdenum, boron and the like.

Examples of the special oxides are the oxides of aluminum, chromium, silicon, manganese, magnesium, and the like.

The core can be prepared by atomization from a metal melt which is highly alloyed or contains hard special carbides and/or oxides. Thereby a homogeneous powder is obtained. The grain size of the powder 20–300 um, depending on the desired properties and the intended use.

DESCRIPTION OF THE PREFERRED EMBODIMENT

When the filler according to the invention is used for spraying, numerous advantages are gained over the fillers used until now and over other spraying methods. These advantages include the following:

A coating which is highly resistant to chemical and mechanical wear

In experiments carried out it was surprisingly observed that a filler wire can be arc sprayed. Furthermore, by arc spraying it was possible to obtain a coating having a micro-hardness of more than 1000 HV. The reference analysis of the filler material was as follows: 5.0% C, 3% Mn, 1.8% Si and 27% Cr, 3% Ti C, and the remainder Fe. The greatest micro-hardness obtained with fillers intended for arc spraying was about 600 HV. This was obtained with a filler the analysis of which was: 0.5% C, 2.5% Mn, 0.8% Si, 8.5% Cr, 0.6% Mo and 0.3% V, and the remainder Fe.

Sprayings were also carried out using the following composition, in which case the result was observed to be very good and economical: 5.5% C, 2% Mn, 1.6% Si, 23% Cr, 7% Mo, 1.5% V, 7% Nb, 2% W and the remainder Fe.

Even though some amount of the alloying ingredients burns off in arc spraying, this does not produce problems in the manufacture of the filler wire because rolling is now not an obstacle to excessive alloying.

The corrosion resistance of the coating is also good; chormium, nickel, molybdenum, copper, etc., can be alloyed in the desired quantities. Furtherore, the sheath of the filler wire can be made from soft alloyed steel when resistance to corrosion so requires. As the alloying ingredients resistant to wear are in the metal powder inside the sheath, the sheath remains soft, and so there are no problems in manufacturing the sheath. Furthermore, these so-called high-chromium steels are suitable for very high temperatures of use, depending on the amount of Cr, W, V, Ni, Nb, Mo and Al alloying.

Economy

The economy of the use of the method according to the invention is affected by the following factors, among others:

- the price of the equipment is only 20% of the price of the plasma equipment
- the equipment is as easy to move from one place to another as, for example, the MIG welding equipment
- the price of the filler will be reasonable, since filler materials having the same composition are already being used in welding
- the method can easily be used for spraying thin coatings, e.g. 0.2-0.5 mm thick, which is not possible in welding. The spraying of thin coatings also enables large surface areas to be coated rapidly
- the spraying efficiency is approximately 5 kg/h; in welding, such an efficiency is achieved only in making thick coatings.

Good mechanical properties

In the experiments carried out it was observed that the adherence of the coating to the base material is 2-3 times better than the adherence of a coating made by powder spraying. The adherence strength is almost as good as that of a plasma-sprayed coating.

Homogeneity of the coatings

The homogeneity of the coating is important not only because of resistance to corrosion but also because of resistance to wear. The homogeneity of the coating is affected both by the grain size of the powder and by the metal powder used. If in arc spraying the grain size of the powder is too small, the particles present in the electric arc overheat and are largely burnt off, a phenomenon which strongly decreases the efficiency and lowers the alloying-ingredient concentration. On the other hand, if the particles are too large, they will not have time to melt in the electric arc and the adherence remains poor. For this reason the grain size of the metal powder is limited. The aim of using the grain size range according to the invention is that all the particles of the homogeneous metal powder melt to an equal degree, in which case the alloying ingredient losses in the different particles are the same, and since the composition of all particles is the same, the coating will be homogeneous.

The grain size is by no means standard in all areas, but modifications are used according to the coating desired. When thin, 0.1-0.3 mm thick, very dense coatings are desired, the grain size range used is 20-80 μm. Within the thickness range 0.3-1 mm, the grain size range used is 80-200 μm. When very thick coatings are being made, the grain size range used is 150-300 μm. Furthermore, if the resistance to corrosion is not important, the grain size range can be used more freely. Also other specific conditions may cause changes in the grain size.

Another factor affecting homogeneity is that a powder made from a homogeneous metal melt having the desired composition is used inside the wire. When these powder particles having a certain grain size melt in the electric arc, a homogeneous coating is obtained even if all particles do not melt entirely.

If a normal filler wire intended for welding is used, the coating will not necessarily be homogeneous, since the powder of a welding wire consists of several different alloying alloys, of which one contains a large amount of chromium, another carbon, the third tungsten, etc. In welding, all the alloying alloys end up in the same melt, where they mix effectively and thereby form a relatively homogeneous metal. In the electric arc of an arc spray such allowing alloys do not necessarily end up in the same melt or become mixed with each other, and so the coating will in such a case be unhomogeneous.

Versatility

The method is as suitable for the coating of boiler walls as for the coating of a peat feeder screw, flue gas blowers, etc. Since during the coating the workpiece heats up at maximum to 100° C., it is possible to coat completed pieces without the risk of deformation. Furthermore, the method is suitable for the coating of worn pieces. In such a case it is possible first to spray on them a filler corresponding to the ordinary base material and then on top of it a wear-resistant layer.

The financial importance of the present invention is best illustrated if we consider boilers and fluidized-bed furnaces of peat power plants. In general the walls of such plants are made from carbon steel or heat-treated steel 2.5-6 mm thick. The resistance of such steels to abrasion and erosion is low. At its worst, the life of boiler pipes is only one year. Since, by the method according to the invention, the useful life of the pipe systems can be multiplied, depending on the thickness of the coating used, very large annual savings are achieved.

Even though a peat power plant with its different parts has been described as a primary application for the invention, the invention is, of course, not limited to the use in question; the procedure according to the invention is very suitable wherever a coating highly resistant to both mechanical and chemical wear is needed.

What is claimed is:

1. A method of arc spraying to produce coatings which are highly resistant to mechanical and/or chemical wear comprising arc spraying utilizing a filler wire having a sheath made from a soft unalloyed for alloyed metal and a core consisting of a homogeneous powder prepared by atomization which is composed of a metal powder or a mixture of a metal powder and special carbides and/or oxides to produce a coating wherein the core has a nominal composition of about 5% C, 3% Mn, 1.8% Si, 27% Cr, 3% TiC, and the remainder Fe.

2. A method of arc spraying to produce coatings which are highly resistant to mechanical and/or chemical wear comprising arc spraying utilizing a filler wire having a sheath made from a soft unalloyed or alloyed metal and a core consisting of a homogeneous powder prepared by atomization which is composed of a metal powder or a mixture of a metal powder and special carbides and/or oxides to produce a coating wherein the core has a nominal composition of about 5.5% C, 2% Mn, 1.6% Si, 23% Cr, 7% Mo, 1.5% V, 7% Nb, 2% W, and the remainder Fe.

3. A method according to claim 1 or 2 in which the core powder has a grain size of 20-300 um.

* * * * *

UNITED STATES PATENT AND TRADEMARK OFFICE
CERTIFICATE OF CORRECTION

PATENT NO. : 4,810,850

DATED : March 7, 1989

INVENTOR(S) : Jaakko Tenkula, Bjarne Hellman and Juha Huusko

It is certified that error appears in the above-identified patent and that said Letters Patent is hereby corrected as shown below:

Column 1 Line 19 "be" should read --by--.

Column 1 Line 46 "sode-ash" should read --soda-ash--.

Column 2 Line 55 "chormium" should read --chromium--.

Column 2 Line 56 "Furtherore" should read --Furthermore--.

Column 4 Line 5 "allowing" should read --alloying--.

Claim 1 Column 4 Line 39 "for" should read --or--.

Signed and Sealed this

Fourteenth Day of November, 1989

*Attest:*

JEFFREY M. SAMUELS

*Attesting Officer*    *Acting Commissioner of Patents and Trademarks*